US010654232B2

(12) United States Patent
Thiele et al.

(10) Patent No.: US 10,654,232 B2
(45) Date of Patent: May 19, 2020

(54) METHOD AND DEVICE FOR PRODUCING AN OPTICAL ELEMENT HAVING AT LEAST ONE FUNCTIONAL REGION, AS WELL AS USE OF THE DEVICE

(71) Applicant: Baden-Wuerttemberg Stiftung gGmbH, Stuttgart (DE)

(72) Inventors: Simon Thiele, Stuttgart (DE); Harald Giessen, Marnheim (DE); Timo Gissibl, Leonberg (DE); Alois M. Herkommer, Aalen (DE)

(73) Assignee: BADEN-WUERTTEMBERG STIFTUNG GGMBH, Stuttgart (DE)

( * ) Notice: Subject to any disclaimer, the term of this patent is extended or adjusted under 35 U.S.C. 154(b) by 153 days.

(21) Appl. No.: 15/336,500

(22) Filed: Oct. 27, 2016

(65) Prior Publication Data

US 2017/0120548 A1    May 4, 2017

(30) Foreign Application Priority Data

Oct. 28, 2015   (EP) .................................... 15003086

(51) Int. Cl.
| | |
|---|---|
| *B29D 11/00* | (2006.01) |
| *G02B 5/00* | (2006.01) |
| *G02B 13/00* | (2006.01) |
| *G02B 27/00* | (2006.01) |
| *G02B 3/12* | (2006.01) |

(Continued)

(52) U.S. Cl.
CPC .... *B29D 11/0074* (2013.01); *B29D 11/00403* (2013.01); *B33Y 30/00* (2014.12); *G02B 3/12* (2013.01); *G02B 5/003* (2013.01); *G02B 13/001* (2013.01); *G02B 26/004* (2013.01);
(Continued)

(58) Field of Classification Search
CPC ..... G02B 26/004; G02B 3/12–14; G02B 5/24
See application file for complete search history.

(56) References Cited

U.S. PATENT DOCUMENTS

| | | | |
|---|---|---|---|
| 6,355,198 B1 | 3/2002 | Kim et al. | |
| 2008/0038713 A1* | 2/2008 | Gao ................. | B01L 3/502715 435/4 |

(Continued)

FOREIGN PATENT DOCUMENTS

DE        102009004377 A1      7/2010

OTHER PUBLICATIONS

European Search Report dated Apr. 22, 2016 in European Patent Application No. 15003086.4, 8 pages.

*Primary Examiner* — Alex A Rolland
(74) *Attorney, Agent, or Firm* — Shook, Hardy & Bacon LLP

(57) ABSTRACT

The present invention relates to a method for manufacturing an optical element (100) having at least one functional region using a 3D-printer, comprising the steps:
  forming a three-dimensional structure (50) of the optical element (100) using a 3D-printer such that the three-dimensional structure (100) has at least one microfluidic cavity (4) for receiving a functional substance (6); and
  filling the at least one microfluidic cavity (4) with the functional substance (6) for forming the at least one functional region.

In addition, the invention relates to a device for manufacturing an optical element (100) as well as a use of the device.

16 Claims, 7 Drawing Sheets

(51) Int. Cl.
  *G02B 26/00* (2006.01)
  *B33Y 30/00* (2015.01)
  *B33Y 80/00* (2015.01)
  *B33Y 40/00* (2020.01)
  *B33Y 10/00* (2015.01)

(52) U.S. Cl.
  CPC .......... *G02B 27/0018* (2013.01); *B33Y 10/00* (2014.12); *B33Y 40/00* (2014.12); *B33Y 80/00* (2014.12)

(56) References Cited

U.S. PATENT DOCUMENTS

| | | | |
|---|---|---|---|
| 2009/0277056 A1* | 11/2009 | Peeters | G02B 5/24 40/406 |
| 2012/0105534 A1* | 5/2012 | Boday | B33Y 70/00 347/20 |
| 2014/0137965 A1* | 5/2014 | Truitt | A41D 27/08 137/596 |
| 2015/0077659 A1 | 3/2015 | Pugh et al. | |
| 2015/0153589 A1 | 6/2015 | Meschenmoser et al. | |
| 2015/0253585 A1 | 9/2015 | Anatole et al. | |

\* cited by examiner

METHOD AND DEVICE FOR PRODUCING AN OPTICAL ELEMENT HAVING AT LEAST ONE FUNCTIONAL REGION, AS WELL AS USE OF THE DEVICE

CROSS-REFERENCE TO RELATED APPLICATION

This application claims priority to European Patent Application No. 15003086.4, filed Oct. 28, 2015, entitled "Verfahren und Vorrichtung zur Herstellung eines optischen Elements mit zumindest einem funktionalen Bereich, sowie Verwendung der Vorrichtung," the contents of which, including the specification and figures thereof, is incorporated herein by reference in its entirety.

DESCRIPTION

The invention relates to a method and a device for producing an optical element having at least one functional region using a 3D-printer. In addition the invention relates to a use of the device.

The 3D-printer of optical elements has increasingly grown in importance as a disruptive technology in recent years. The advantage of 3D-printing in comparison with conventional production methods for optics lies in particular in the greater flexibility and the cost savings. Thus with 3D-printing technology, molds which previously had to be manufactured first are no longer necessary for the optics to be produced. Rather, instead of the mold, for the optics to be produced, only a file has to be created, on which basis the 3D-printer manufactures the desired component or the desired optics.

In the meantime, 3D-printers have become obtainable on the market by which complex (micro-) optics can be manufactured by additive methods. As an example, the commercially available 3D-printer of the "Luxexcel" company of the Netherlands or the "Nanoscribe GmbH" of Germany should be mentioned.

A weak point of the 3D-printing technology, however, is the fact that the component to be printed on the basis of the presently available materials can be configured only as completely transparent. Absorbing structures cannot readily be printed in conjunction, so that important elements such as apertures or structures for dispersed light absorption, which within the scope of this invention are generally termed as functional elements or functional regions, cannot be implemented in the classic sense. In particular micro-optics to date cannot be provided with functional elements or regions by means of a 3D-printing method in a simple manner.

Of course it is basically conceivable that in the future such functional regions will be produced by additional printing of the non-transparent material. However, this is associated with considerable difficulties, in particular for the two-photon-polymerization technology of the "Nanoscribe" company. Since here a stereo-lithographic method is used, the material for the structure must meet comprehensive requirements. Among others, for polymerization in the near infrared range, it must be transparent, which runs counter to the desire for an optically dense material. In the "Luxexcel" system, however, the additional placement of the materials is indeed fundamentally possible, but to date the capabilities of this technology have not been adequate for applications in micro-optics.

It is therefore an object of the present invention to provide an improved method for the manufacture of an optical or micro-optical element having at least one functional region by means of a 3D-printer. In addition, it is an object of the present invention to provide a corresponding device and to indicate a use of this device.

This object is achieved by the subject matter of the independent claims. Advantageous embodiments are the subject matter of the dependent claims.

A first independent aspect for achieving the task relates to a method for manufacturing an optical or micro-optical element having at least one functional region, comprising the steps:

forming a three-dimensional structure of the optical element using a 3D-printer such that the three-dimensional structure has at least one microfluidic cavity for receiving a functional substance, in particular by means of capillary forces; and filling the at least one microfluidic cavity with the functional substance for forming the at least one functional region.

An optical element or optics within the meaning of this description is understood as an element or structure with specific or predetermined optical properties, for example a lens and/or an aperture etc. The optical element can have dimensions or extents in the micrometer range, that is sizes smaller than 1 mm, for example smaller than 500 µm and preferably smaller than 300 µm, and are therefore also termed micro-optical elements or micro-optics. For example, optics or micro-optics can have the diameter of around 10 µm to 500 µm, in particular of around 120 µm, and a length of around 100 µm to 250 µm.

A functional region is understood as a region of the optical element that has a specific or predetermined functionality. The functionality can be, for example, specific or predetermined reflection capacity or absorption capacity. The functionality can for example also relate to color filtration or color filter properties and/or achromatic properties. Alternatively or additionally, the functionality can be a specific or predetermined dispersing capacity. Thus the functionality can be, for example, that light can be tailor-made, in particular depending on the wavelength. The optical element to be manufactured or the ready-made optical element can therefore also be termed a functional element, a functional optical element, or functional optics or functional micro-optics.

In a first step of the method according to the invention, a three-dimensional structure or base- or raw structure of the optical element is formed or printed using a 3D-printer.

For forming this three-dimensional structure, advantageously a material optimally suited for the respective 3D-printer can be used. In the case of a stereo-lithographic method, a transparent photoresist, for example, can be used for forming the three-dimensional structure of the optical element. In the case of the 3D-printer of Nanoscribe GmbH, for example, the following photoresists can be used: Nanoscribe IP-S, Nanoscribe and/or micro-resist technology, OrmoComp.

The three-dimensional structure can in particular be a microscale or micro-optical structure, that is a structure with dimensions in the micrometer range. The three-dimensional structure is preferably transparent.

"Transparent" within the meaning of the present description is understood as a physical property of a material or a structure on the basis of which light in the near infrared range, in the visible spectrum range and/or in the near UV range can substantially pass through the material or structure. "Substantially" means in this regard more than 50%, preferably more than 75%, more preferably more than 90%, and most preferably more than 95%.

The three-dimensional structure formed with the 3D-printer has at least one microfluidic cavity that is suited for receiving a functional substance, in particular by the use of capillary effects or by the effects of capillary forces. In other words, the at least one microfluidic cavity is configured to receive a functional substance, in particular by means of a capillary effect or by means of capillary forces.

A "microfluidic cavity" within the meaning of this description is understood to be a hollow space that has small dimensions such that a fluid, in particular a liquid, behaves as a micro-fluid. A fluid or a liquid behaves as a micro-fluid when, in contact with the microfluidic cavity or the hollow space, it is dominated by properties or effects, in particular capillary effects or capillary forces that in classic fluid mechanics can often be ignored.

The three-dimensional structure is formed or printed using the 3D-printer on the basis of a predefined or predetermined layout or design. The layout or design is produced using software belonging to the 3D-printer and is stored as a file. This file is ultimately sent to the 3D-printer or made available to it so that the 3D-printer on the basis of the file can form or print the desired structure.

Preferably the above-named first step thus comprises providing a layout or design of the optical elements to be manufactured. Here the layout has at least one microfluidic cavity for forming the functional region.

A "functional substance" or a "functional liquid" is within the meaning of this description understood as a substance and in particular as a fluid or a liquid that is suitable or that has features so as to impart to the at least one functional region of the optical element the corresponding, that is the desired or the predefined functionality. For example, the functional substance or liquid can have functional, in particular reflective or absorbing particles or dyes. These functional particles or dyes can be deposited or accumulate in the microfluidic cavities so as to form the at least one functional region of the optical element. The functional substance or liquid can for example be absorbent or reflective in specific wavelength ranges or broadband, have or make available a specific refractive index and/or Abbe number or can be diluted with functional nanoparticles. Alternatively or additionally the functional substance can have specific dispersion properties. Thus, for example, the functional substance can have or be a matte or glittering liquid. In particular, the functional substance can have or be a paint. The paint can, for example, depending on the angle reflect and/or disperse another color or wavelength. The functional substance can also have fluorescent dyes. The fluorescent dyes can for example enable a wavelength conversion. Alternatively or additionally the functional substance can have pigments. For example, the functional substance can have or be an ink, that is a liquid with pigments dissolved therein. By means of the pigments, advantageously specific absorption and/or dispersion properties of the functional substance can be achieved. For example, the functional substance can have or be a black ink. In particular the functional substance can have or be a metallic ink, that is a liquid with metal particles dissolved therein. Through the metal particles, advantageously specific reflective properties of the functional substance can be achieved. It goes without saying that the functional substance can have a combination of the above-named materials or can be a combination of the above-named materials.

The term "filling" within the meaning of the description comprises a partial or complete filling. In a partial filling, a bottom surface of the microfluidic cavity can be covered or wetted with the functional substance, but the cavity or the hollow space is not completely filled with the functional substance. In particular the at least one microfluidic cavity can be at least partially filled or also only wetted.

Using the method according to the invention, it is advantageously possible to produce regions that are absorbent or provided with some other functionality inside or on the outer surface of an optical component printed with a 3D-printer. In this way the functionalities of these components can be considerably broadened or new functionalities can be made possible. Examples of these are apertures, color filters, or achromatics.

In a preferred embodiment the at least one microfluidic cavity is configured so as to receive the functional substance with the use of capillary effects or capillary forces.

In a further preferred embodiment, the filling of the at least one microfluidic cavity with the functional substance preferably takes place using capillary effects or under the effects of capillary forces.

In particular the microfluidic cavity is formed or the microfluidic cavity is bid out or configured or has dimensions that are so small that with a fluid or a liquid, that is in particular with a functional substance that is or comes into contact with the hollow space, capillary effects ensue.

In a further preferred embodiment of the method, the at least one functional microfluidic cavity is formed such that it has a dimension or extent, that is a length and or width, in particular a gap with and/or a diameter of less than 100 µm, preferably less than 75 µm, more preferably less than 50 µm, and most preferably less than 20 µm, and in particular of less than 10 µm. For example the at least one microfluidic cavity has a dimension or a gap width of 5 µm to 10 µm.

Advantageously at a size scale of less than 100 µm, capillary effects have a great influence and ensure that liquids for breaking down surface energy are drawn directly into microfluidic cavities or hollow spaces with such dimensions.

In a further preferred embodiment of the method, filling of the at least one microfluidic cavity comprises wetting of the at least one microfluidic cavity of the formed three-dimensional structure with the functional substance.

In other words, according to the above-described first step, the at least one microfluidic cavity of the formed or printed three-dimensional structure is wetted with the functional substance. The wetting can be or comprise in particular dispensing or dripping with a dispenser or a cuvette.

Alternatively or additionally, filling of the at least one microfluidic cavity can comprise the introduction of the functional substance in the at least one microfluidic cavity for forming the at least one functional region.

The at least one functional region of the optical element comprises the at least one microfluidic cavity. Here a functional region can comprise precisely one microfluidic cavity. It is also possible, however, that the functional region comprises several microfluidic cavities.

In a further preferred embodiment, filling of the at least one microfluidic cavity with the functional substance or the introduction of the functional substance in the at least one microfluidic cavity, or allowing the functional substance to be drawn in, entails in particular a waiting period, for example between 1 and 60 seconds. Whereas the drawing can occur very quickly, that is within seconds, the filling process itself can take longer, in particular when the filling is drop-wise.

Alternatively or additionally, the filling of the at least one microfluidic cavity with functional substance or the introduction of functional substance in the at least one microfluidic cavity preferably comprises an application or imposition of pressure, in particular external pressure, on the functional substance. In other words, the functional substance can be placed in the at least one microfluidic cavity by application of pressure.

Alternatively or additionally, the filling of the at least one microfluidic cavity with the functional substance or the introduction of the functional substance in the at least one microfluidic cavity preferably comprises a bombardment of the at least one microfluidic cavity with micro-droplets. Preferably the micro-droplets have a diameter of less than 1 μm. The bombardment with micro-droplets can in particular be carried out using a so-called "Super Inkjet" printer, as offered for example by the Japanese company "SIJ Technology Inc." This Super Inkjet Printer advantageously permits bombardment of the microfluidic cavity with droplets of various substances that have a diameter<1 μm and thus can also be introduced in a targeted manner in cavities with minimal dimensions, for example<3 μm. Thus advantageously a very precise filling of the at least one microfluidic cavity with the functional substance is possible.

In a further preferred embodiment, the method further comprises hardening of the functional substance or fluid. This can for example depending on the respective functional substance be carried out by heating or cooling and/or by illumination, for example with UV light of the functional substance. In particular the hardening can be accelerated in this manner. Alternatively or additionally the method further comprises a drying or allowing to dry of the functional substance or liquid. The drying can for example be carried out simply by waiting and/or by warming and/or illumination and or blow-drying. It is also possible that the desired functionality is acquired by or made available to the substance only by hardening and/or drying.

In a further preferred embodiment, the method comprises at least one partial removal, in particular draining or allowing to drain and/or volatizing or allowing to volatize of the functional substance.

A further independent aspect for achieving the object relates to a device for manufacturing an optical or micro-optical element having at least one functional region, comprising:
 a 3D-printer for forming a three-dimensional, in particular scale or micro-optical structure of the optical element, wherein the three-dimensional structure has at least one microfluidic cavity, and wherein the at least one microfluidic cavity is suited for receiving a functional substance; and
 a means for wetting and/or filling of the at least one microfluidic cavity of the formed or printed three-dimensional structure with the functional substance.

The three-dimensional structure is formed or printed by means of a 3D-printing technology, that is, by means of a 3D-printer or a 3D-printing method. The 3D-printer or the 3D-printing method is preferably a 3D-laser-lithography system or a 3D-laser-lithography method. As an example of a 3D-printer or a 3D-printing system, the commercially available 3D-laser-lithography system "Photonic Professional GT™" of the Nanoscribe GmbH may be mentioned, which is based on a two-photon polymerization of a UV hardening photoresist. It goes without saying that basically other 3D-printers or other 3D-printing methods can also be used.

The at least one microfluidic cavity is preferably laid out or formed or has small sizes or dimensions so as to receive or to be able to receive the functional substance using the capillary effects or the effects of capillary forces.

The means for wetting and/or filling of the at least one microfluidic cavity can for example comprise a dispenser. Alternatively or additionally, the means for wetting and/or filling of the at least one microfluidic cavity can comprise a Super Inkjet printer. With a Super Inkjet Printer, the at least one microfluidic cavity can be bombarded with micro-droplets of the functional substance, so that in this way advantageously a very precise filling of the at least one microfluidic cavity is possible.

In a further preferred embodiment, the at least one microfluidic cavity can have a dimension or extent, that is a length and/or width and/or a diameter of less than 100 μm, preferably less than 75 μm, more preferably less than 50 μm, and most preferably less than 20 μm, in particular of less than 10 μm.

In a further preferred embodiment, the device further comprises a pressure-generating unit for application or imposition of a pressure by which the functional substance is introduced in the at least one microfluidic cavity of the at least one functional region.

A further independent aspect for achieving the object relates to a use of the device according to the invention for manufacturing an optical, in particular micro-optical element having at least one functional region.

Preferably the three-dimensional structure and the at least one microfluidic cavity of the optical element are manufactured or formed by means of a 3D-lithography system, in particular by means of a 3D-laser-lithography system or a 3D-multiphoton-laserlithography system, which preferably is based on a two-photon-polymerization of a UV-hardening photoresist.

For the above-named further independent aspects and in particular for the preferred embodiments in this regard, the present or subsequently made remarks regarding the embodiments of the first aspect apply. In particular for an independent aspect of the present invention and for the preferred embodiments in this regard, the present and subsequently made arguments regarding the embodiments of the respective other aspects apply.

Below individual embodiments for achieving the object are described by way of example with reference to the figures. Here the individual described embodiments in part have features that are not mandatory for implementing the claimed object, but provide desired properties in specific application cases. Thus also embodiments shall be viewed as disclosed under the described technical teaching that do not have all features of the embodiments described below. Furthermore, so as to avoid unnecessary repetitions, certain features are mentioned only with respect to some of the embodiments described below. It is pointed out that the individual embodiments therefore are not taken only for themselves, but should also be viewed in their aggregate. With reference to this aggregate, the person skilled in the art will recognize that individual embodiments can be modified also by inclusion of individual or several features of other embodiments. It is pointed out that a systematic combination of the individual embodiments with individual or a number of features that are described with reference to other embodiments can be desirable and reasonable and therefore considered and should also be viewed as covered by the description.

SHORT DESCRIPTION OF THE DRAWINGS

DETAILED DESCRIPTION OF THE DRAWINGS

Figure 1:
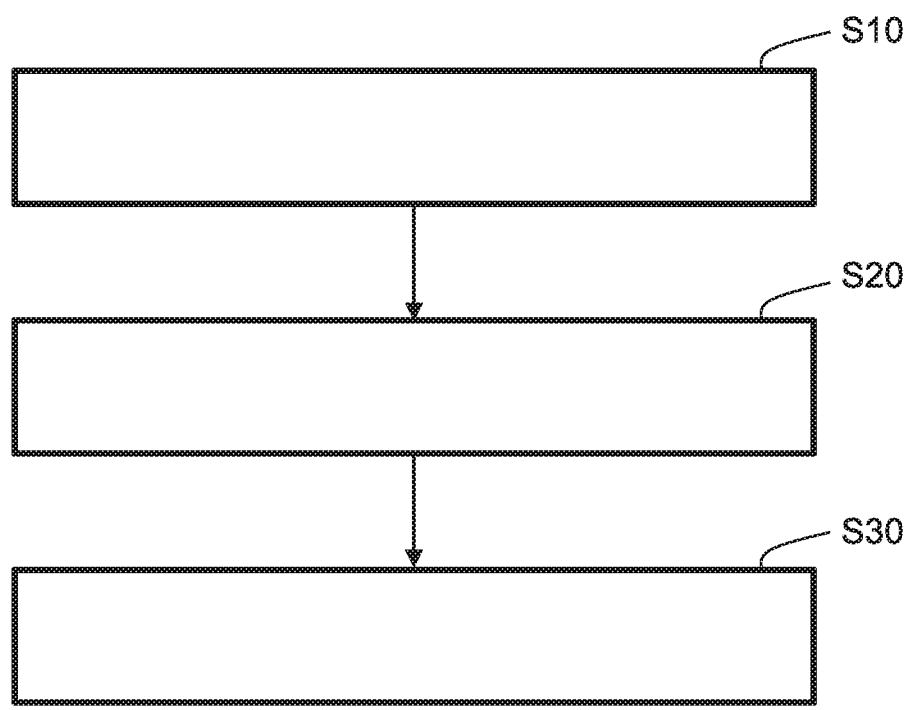
FIG. 1 shows a schematic flowchart of the method according to the invention according to a preferred embodiment.

FIG. 1 shows a schematic flowchart of the method according to the invention for manufacturing an optical element with at least one functional region according to a preferred embodiment.

In a first step S1 a three-dimensional structure of the optical element is formed using a 3-D printer by providing a layout or design of the optical element to be manufactured in the form of a file. The layout according to the invention has at least one microfluidic cavity for forming a functional region. The forming or printing of the three-dimensional structure using the 3-D printer proceeds on the basis of the provided layout or file which is sent to the 3-D printer. That is, the formation of the three-dimensional structure proceeds in such a way that the three-dimensional structure has at least one microfluidic cavity. The at least one microfluidic cavity is suited for receiving a functional substance or liquid that forms the functionality of the optical element or that is used to form the functionality of the optical element.

Subsequently the at least one microfluidic cavity of the formed three-dimensional structure is filled with the functional substance. The filling proceeds in particular by means of a step S2 in which see at least one microfluidic cavity, for example using a dispenser or a cuvette, is wetted, that is, in which the functional liquid is brought into contact or touch with specific regions of the three-dimensional structure, and a step S3, in which the functional substance is introduced into the at least one microfluidic cavity for forming the at least one functional region. The steps S1 and S2 of FIG. 1 can thus be described generally as filling of the at least one microfluidic substance.

The filling or wetting of a microfluidic cavity can for example comprise dripping of the liquid into the at least one microfluidic cavity or its surroundings. By means of the onset or exploitation of capillary effects or by means of the effects of capillary forces in association with the at least one microfluidic cavity, the functional substance or liquid is introduced or drawn into the at least one microfluidic cavity.

Alternatively or additionally, an external pressure can also be applied so as to introduce the liquids into the desired hollow spaces. In particular the functional substance or liquid can be introduced into the at least one microfluidic cavity using pressure.

Thus the invention provides, in addition to the optically affective transparent structure, the printing of microfluidic cavities that subsequently are filled by means of a dispenser with a suitable functional substance or liquid. This liquid can for example in specific wavelength ranges or broadband be absorbent or reflective, can make available a specific refraction index or Abbe coefficient or can be diluted with functional nanoparticles. The liquid can subsequently harden, dry, or color the surface, and drain or volatize.

The method described herein makes it possible to broaden 3D-printed optics with new functionalities that until now were not possible. The method here is simple and effective. Optical elements with additionally functionalized regions have potentially a significantly enlarged performance capacity. For instance, by way of example some designs function when an absorbing aperture is attached to a specific point or the lens edge is blackened.

Furthermore there is the capability of integrating new materials effectively into the design, which until now was not readily feasible. Thus for example by using two different dispersive materials, one printed and one introduced subsequently, the chromatic aberration of an optical system can be corrected.

Figure 2A:
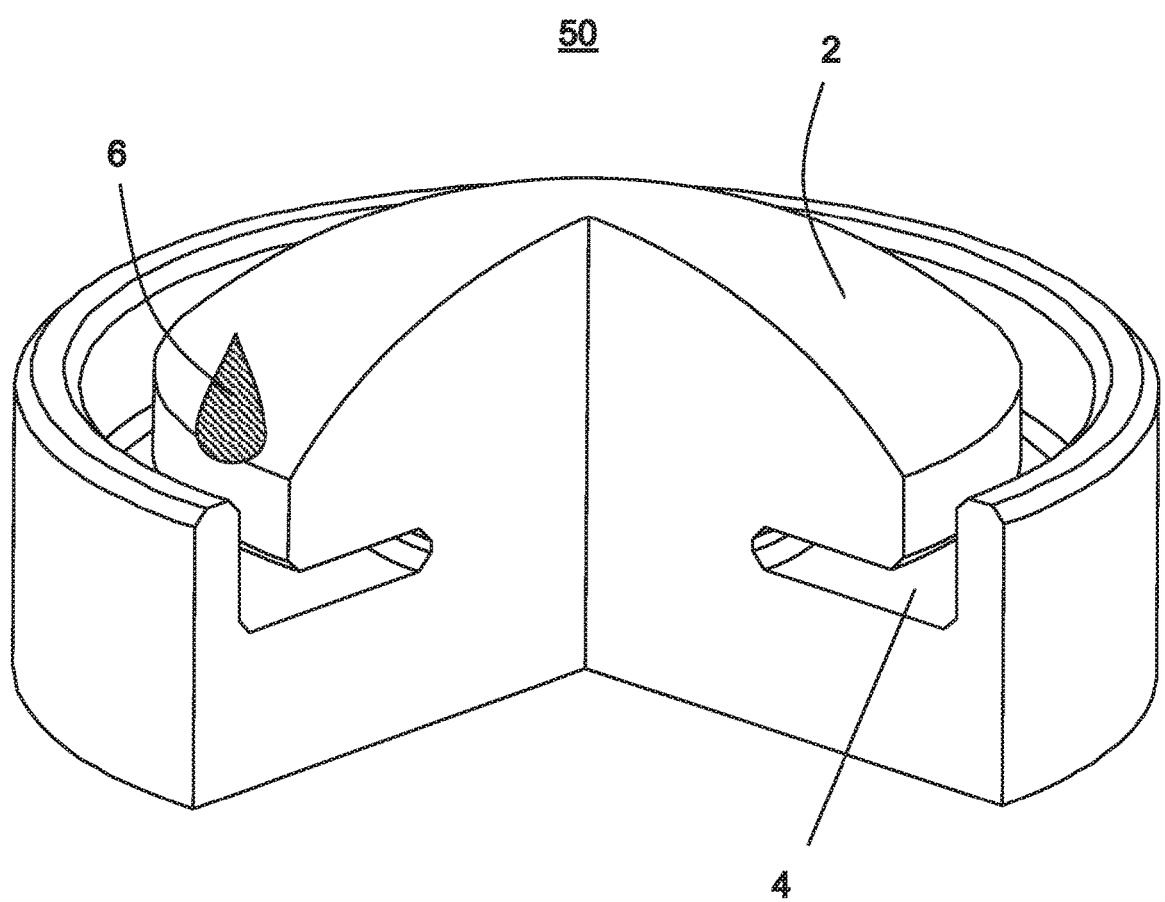
FIG. 2a shows a schematic drawing of an exemplary three-dimensional structure with a micro-cavity which can be printed according to the method of the invention or the device according to the invention by means of a 3-D printer so as to manufacture a functional optical element.

FIG. 2a shows a schematic drawing of an exemplary three-dimensional structure 50, namely a lens 2, which according to the method of the invention or the device according to the invention, can be made using a 3-D printer.

So that a functional optical element 100 can be manufactured from the three-dimensional structure 50, the three-dimensional structure has a microfluidic cavity 4 that can be wetted or filled with a functional substance 6. As is suggested in FIG. 2a, this filling can for example occur by droplet filling from above.

Figure 2B:
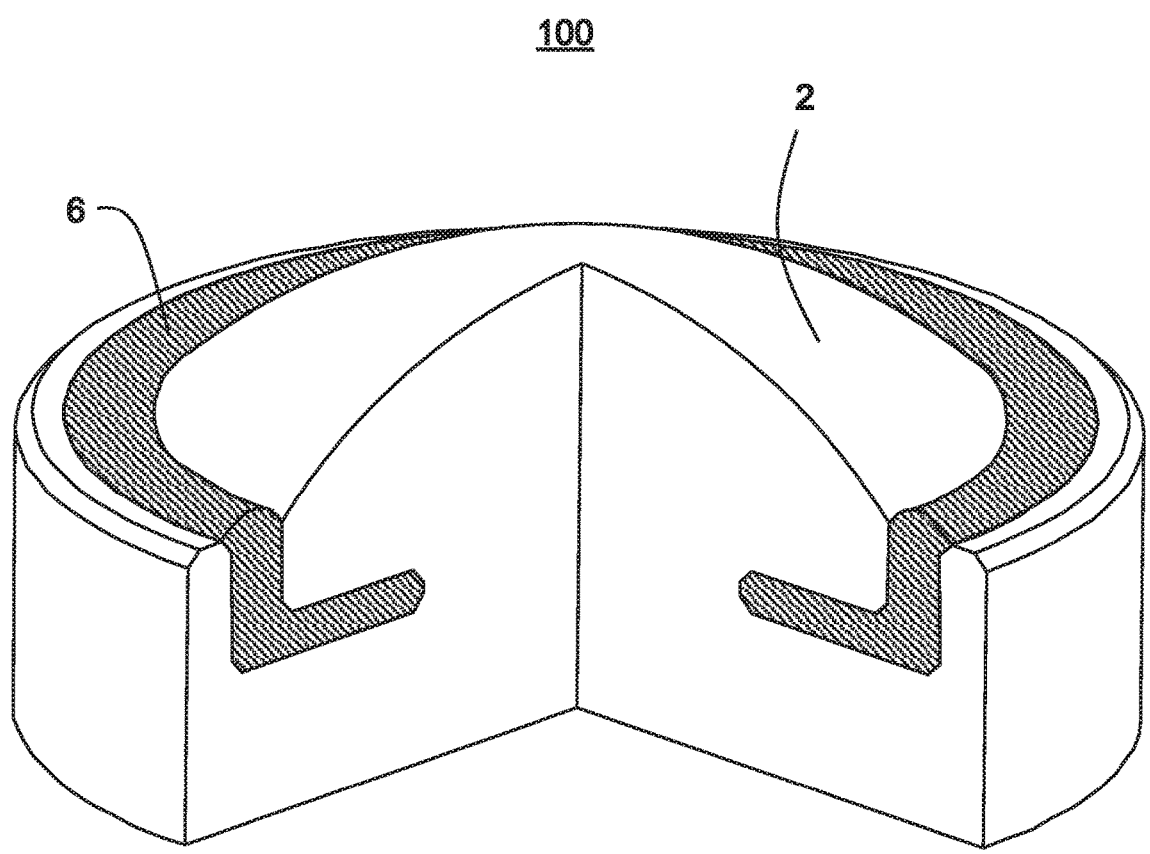
FIG. 2b shows a schematic drawing of an exemplary finished optical element which is created by filling of the micro-cavity of the three-dimensional structure of FIG. 2a with a functional liquid.

FIG. 2b shows a schematic drawing of the finished optical element 100, namely a lens with aperture. The aperture is formed in that the microfluidic cavity 4 is filled with the functional substance 6. In this shown example, the functional substance or liquid 6 can harden after a specific time.

Figure 3A:
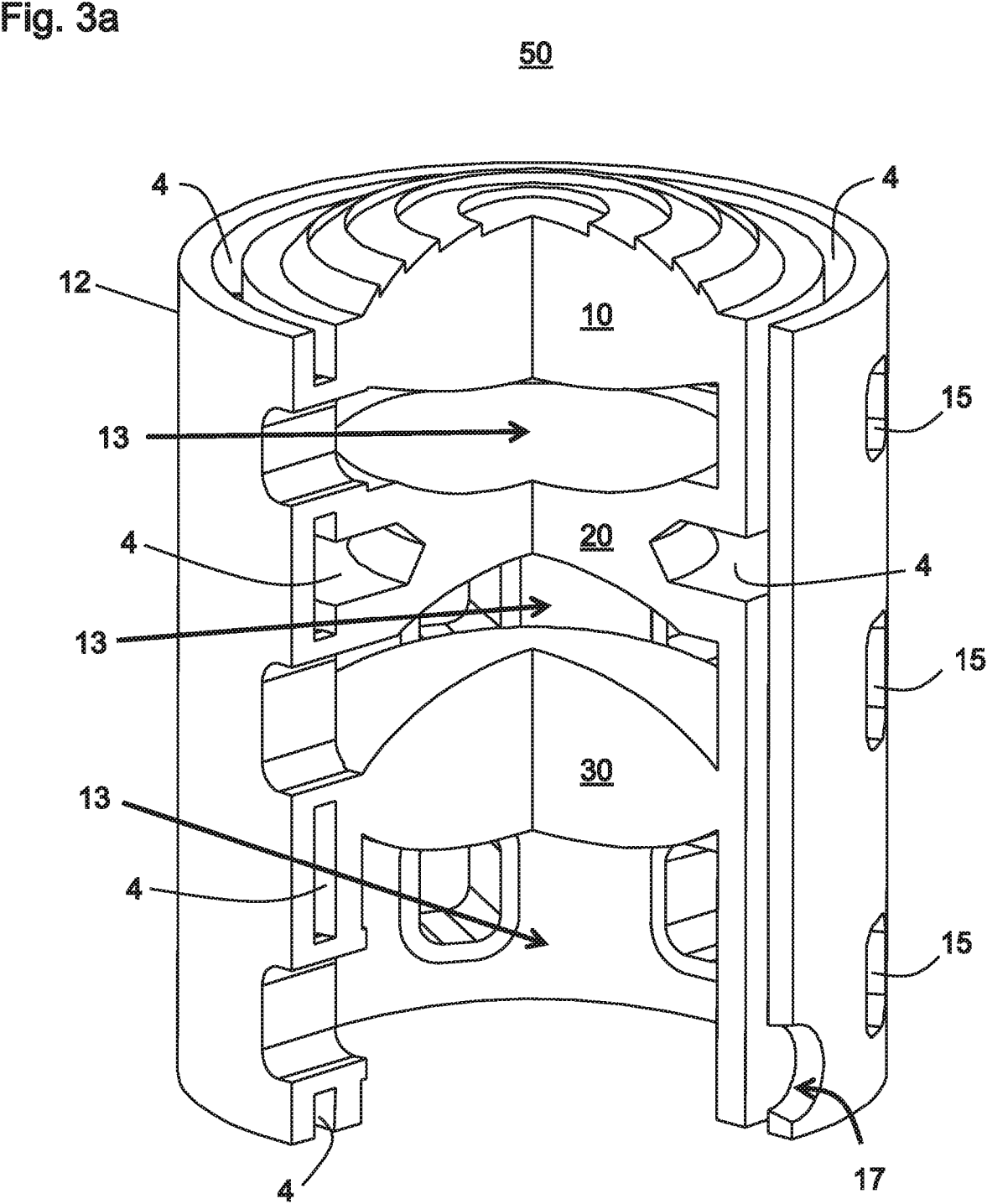
FIG. 3a shows a schematic drawing of a further exemplary three-dimensional structure with micro-cavities, which according to the method of the invention or the device according to the invention can be printed by means of a 3-D printer so as to manufacture a functional optical element.
Figure 3B:
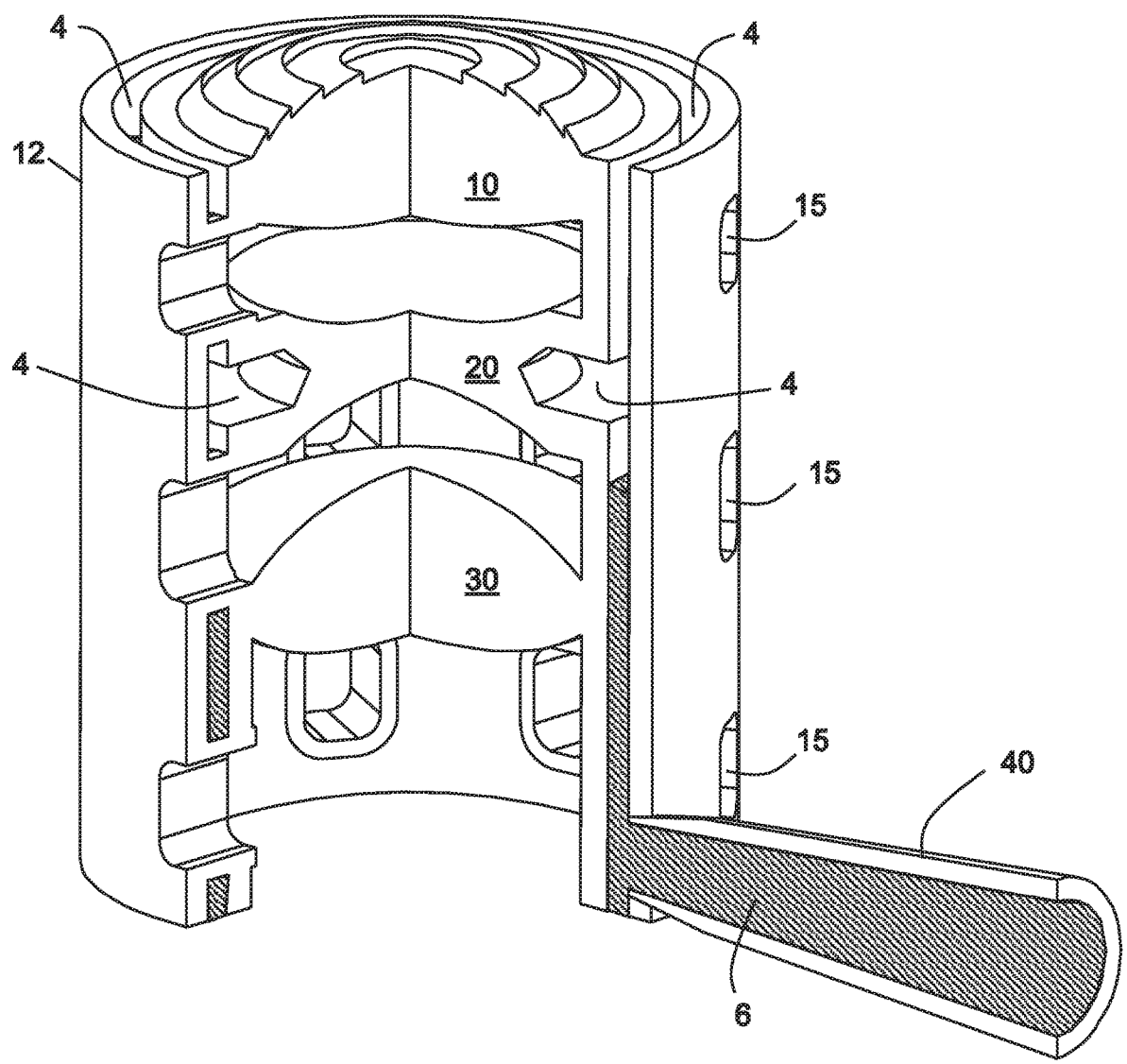
FIG. 3b shows a schematic drawing of the filling process of the micro-cavities of the three-dimensional structure of FIG. 3a with a functional liquid.
Figure 3C:
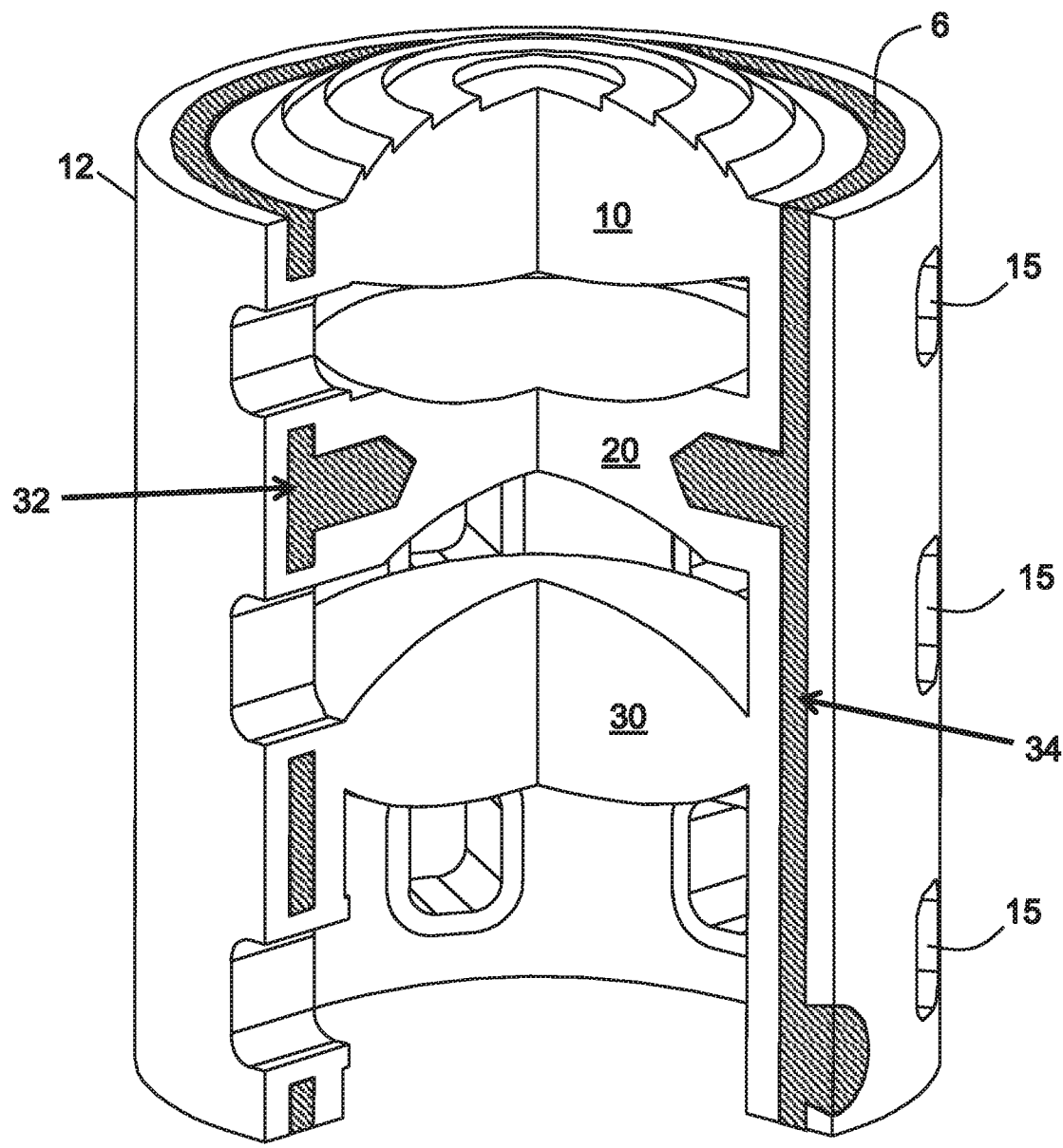
FIG. 3c shows a schematic drawing of a further exemplary finished optical element which is created by filling of the micro-cavities of the three-dimensional structure of FIG. 3a or 3b with a functional liquid.

FIGS. 3a to 3c show schematic drawings for comparatively complex production of an exemplary lens system with aperture and edge blackening.

Here in FIG. 3a the necessary three-dimensional structure 50 for this is shown, which also can be designated as the base or raw structure. This raw structure 50 comprises three lenses 10, 20, 30, which are held in a casing 12 printed at the same time. The casing 12 has lateral openings 15 through which the non-hardened or non-polymerized paint can drain from the lens intermediate spaces 13 after the writing process or 3D printing process. In addition there are hollow spaces, that is, microfluidic cavities 4, in the casing 12, which have no connection to the lens intermediate spaces 13. These microfluidic cavities 4 after the 3D-printing are filled with a functional substance or liquid 6 (in FIG. 3c the hollow spaces are filled with a function liquid and therefore shown hatched). In this example, the filling can be via a cannula, which is flanged to a lateral opening 17.

In FIG. 3b, the filling process of the microfluidic cavities 4 of the three-dimensional structure 50 of FIG. 3a with a functional substance or liquid 6 is shown schematically. Via a cannula 40, of which only the tip is shown here, the liquid 6, in this example for producing the aperture and for blackening of the lens edge, is injected using pressure and/or suctioned in by capillary forces. The pressure with which the liquid 6 is introduced can for example be applied via a closed print-controller in a very defined manner.

FIG. 3c finally shows the finished optical element 100, in this example a three-lens objective, in which an aperture 32 and a blackened edge 34 were realized.

Figure 4B:
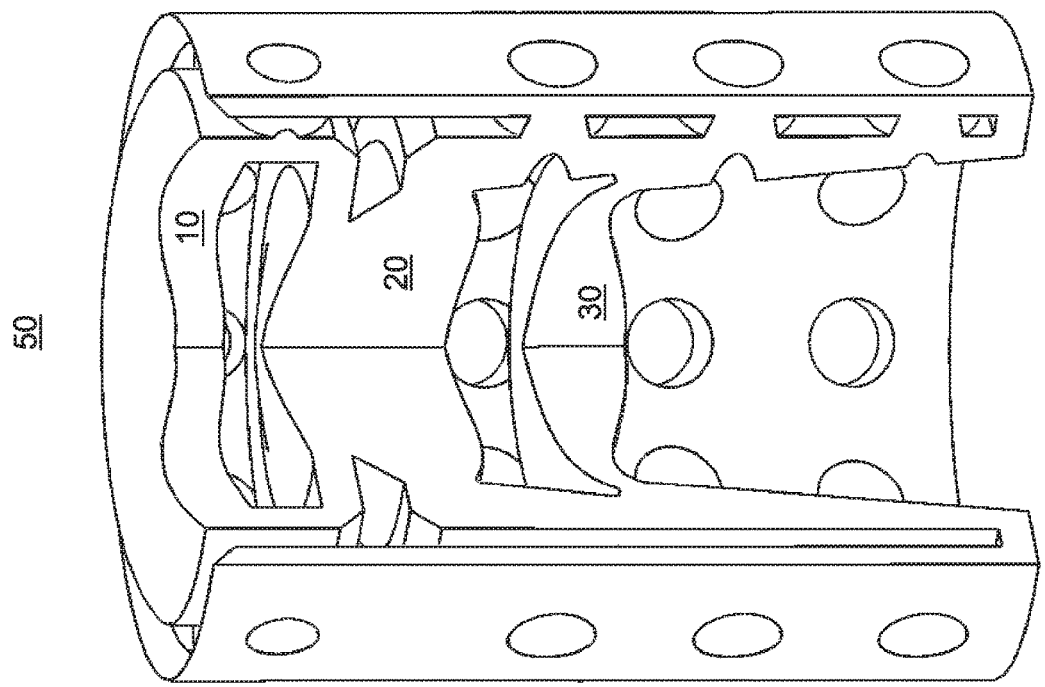
FIG. 4b shows a CAD construction belonging to an optical element of FIG. 3c.
Figure 4A:
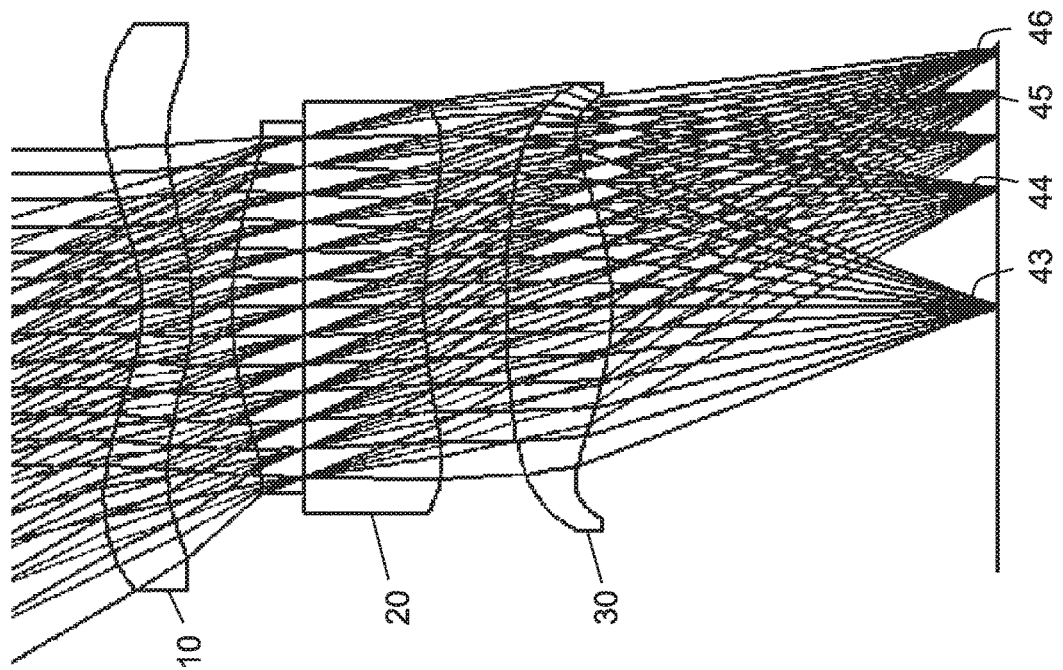
FIG. 4a shows a schematic sketch of the functioning of the optical element of FIG. 3c.

FIG. 4a illustrates the functional principle or the optical design of the system manufactured with the method according to the invention of FIGS. 3a to 3c, while in FIG. 4b the associated CAD (computer-aided design) construction is shown.

In both FIGS. 4a and 4b, the three lenses 10, 20, and 30 respectively may be seen. As shown in FIG. 4a, light beams that fall from above on the lens system with different directions of incidence, are focused on different spots. Here the reference symbols 43 to 47 in FIG. 4a symbolize the light rays with different directions of incidence. Such optics can be realized using an aperture 32 (see FIG. 3c), as the light otherwise would strike the image plane via an undesired path and thus degrade the image quality. The manufacture of such an aperture in a simple and precise manner is possible with the device according to the invention.

REFERENCE SYMBOLS LIST 2 lens
4 microfluidic cavity/hollow space
6 functional substance/functional liquid
10 lens
12 casing
13 intermediate space
15 opening
17 opening
20 lens
30 lens
32 aperture
34 blackened edge
40 dispenser/cannula
43 light beam
44 light beam
45 light beam
46 light beam
47 light beam
50 three-dimensional structure/base structure/raw structure
100 optical or micro-optical element/optics or micro-optics
S10 forming of a three-dimensional structure
S20 wetting of at least one microfluidic cavity of the formed three-dimensional structure with a functional substance
S30 introduction of a functional substance into the at least one microfluidic cavity

The invention claimed is:

1. A method for manufacturing an optical element having at least one functional region that is formed to provide a predetermined optical property, the method comprising:
    forming a three-dimensional structure of the optical element using a 3D-printer such that the three-dimensional structure has at least one microfluidic cavity for receiving a functional substance;
    filling the at least one microfluidic cavity with the functional substance to form the at least one functional region with the predetermined optical property; and
    hardening and/or drying the functional substance.

2. The method according to claim 1, wherein the at least one microfluidic cavity is formed such that it can receive the functional substance using capillary effects.

3. The method according to claim 1, wherein the filling of the at least one microfluidic cavity with the functional substance occurs using capillary effects.

4. The method according to claim 1, wherein the at least one microfluidic cavity is formed such that it has a length and/or width and/or diameter of less than 100 μm.

5. The method according to claim 1, wherein the filling of the at least one microfluidic cavity comprises:
    wetting the at least one microfluidic cavity of the formed three-dimensional structure with the functional substance; and/or
    introducing the functional substance into the at least one microfluidic cavity.

6. The method according to claim 1, wherein the filling of the at least one microfluidic cavity with the functional substance comprises allowing drawing in of the functional substance and/or application of pressure and/or bombardment with micro-droplets.

7. The method according to claim 1, further comprising:
    at least partially removing the functional substance from the at least one microfluidic cavity.

8. The method according to claim 1, wherein the predetermined optical property comprises at least one of a reflection capacity, an absorption capacity, a dispersion capacity, and a color filtration.

9. The method according to claim 1, further comprising using the optical element to reflect, absorb, disperse, and/or color filter an emission of light.

10. The method according to claim 1, further comprising subsequently introducing an additional functional substance into the at least one microfluidic cavity to impart an additional predetermined optical property to the at least one functional region.

11. The method according to claim 10, wherein the additional predetermined optical property comprises adjustment of a chromatic aberration present in the at least one functional region.

12. A method of using a 3D-printer to manufacture an optical element having at least one functional region that is formed to provide a predetermined optical property, the method comprising:
    forming a three-dimensional structure of the optical element using the 3D-printer such that the three-dimensional structure has at least one microfluidic cavity for receiving a functional substance;
    filling the at least one microfluidic cavity with the functional substance to form the at least one functional region with the predetermined optical property; and
    hardening and/or drying the functional substance.

13. The method according to claim 12, wherein the at least one microfluidic cavity is formed such that it can receive the functional substance using capillary effects.

14. The method according to claim 12, wherein the filling of the at least one microfluidic cavity with the functional substance occurs using capillary effects.

15. The method according to claim 12, wherein the at least one microfluidic cavity is formed such that it has a length and/or width and/or diameter of less than 100 μm.

16. The method according to claim 12, wherein the filling of the at least one microfluidic cavity comprises:
    wetting the at least one microfluidic cavity of the formed three-dimensional structure with the functional substance; and/or
    introducing the functional substance into the at least one microfluidic cavity.

* * * * *